(12) United States Patent
Chong

(10) Patent No.: US 6,393,658 B1
(45) Date of Patent: May 28, 2002

(54) CABLE PORT GROMMET FOR MODULAR OFFICE FURNITURE

(75) Inventor: Jonathan Chee Yeen Chong, Chicago, IL (US)

(73) Assignee: The Marvel Group, Inc., Chicago, IL (US)

( * ) Notice: Subject to any disclaimer, the term of this patent is extended or adjusted under 35 U.S.C. 154(b) by 0 days.

(21) Appl. No.: 09/491,973

(22) Filed: Jan. 27, 2000

Related U.S. Application Data

(60) Provisional application No. 60/117,771, filed on Jan. 29, 1999.

(51) Int. Cl.[7] .......................... H01B 17/26; H01B 17/58
(52) U.S. Cl. .................... 16/2.2; 174/153 G; 312/223.6
(58) Field of Search .................... 16/2.2, 2.1; 174/65 G, 174/156, 153 G, 48; 248/56; 312/223.1, 327, 223.6

(56) References Cited

U.S. PATENT DOCUMENTS

| | | | |
|---|---|---|---|
| 1,490,252 A | 4/1924 | Bissell | |
| 2,329,529 A | 9/1943 | Gwinn, Jr. et al. | |
| 3,372,441 A | 3/1968 | Fisher | |
| 3,857,136 A | * 12/1974 | Dean | 16/2.1 |
| 4,053,701 A | 10/1977 | Ogilivie et al. | |
| D276,311 S | 11/1984 | Cournoyer et al. | |
| 4,520,976 A | 6/1985 | Cournoyer et al. | |
| D285,044 S | 8/1986 | Mockett | |
| 4,656,689 A | 4/1987 | Dennis | |
| 4,688,491 A | 8/1987 | Herrera et al. | |
| 4,718,741 A | 1/1988 | Nichoalds | |
| 4,730,363 A | 3/1988 | Asbaghi | |
| D296,761 S | 7/1988 | Mockett | |
| 4,770,643 A | * 9/1988 | Castellani et al. | 174/67 |
| D298,494 S | 11/1988 | Mockett | |
| D317,559 S | 6/1991 | Simonton | |
| 5,130,494 A | * 7/1992 | Somonton et al. | 174/153 G |
| 5,162,612 A | 11/1992 | Naka et al. | |
| 5,167,047 A | 12/1992 | Plumley | |
| D354,903 S | 1/1995 | Mockett | |
| 5,429,431 A | * 7/1995 | Olson et al. | 312/223.6 |
| 5,451,101 A | * 9/1995 | Ellison et al. | 312/223.6 |
| 5,488,198 A | * 1/1996 | Kramer | 174/153 G |
| 5,686,700 A | 11/1997 | Carpinella | |
| 5,715,761 A | * 2/1998 | Frattini | 312/223.6 |
| 5,765,932 A | 6/1998 | Domina et al. | |

* cited by examiner

Primary Examiner—Chuck Y. Mah
(74) Attorney, Agent, or Firm—Edgar A. Zarins; Lloyd D. Doigan

(57) ABSTRACT

A modular office system incorporating tubular beams forming the structure of the furniture and facilitating the running of electrical, phone and computer wiring through the tubular beams. In order to provide entry and exit from the tubular beams for the wiring, plastic grommets are mounted within openings in the tubular members. The grommet includes a frame mounted to the tubular member and having an oval opening. A closure member is mounted within the opening of the frame. The closure includes a pair of flaps which selectively facilitate passing of wire through the grommet. The flaps are connected to a center portion by a living hinge allowing the flaps to be moved inwardly to open a portion of the grommet opening.

9 Claims, 3 Drawing Sheets

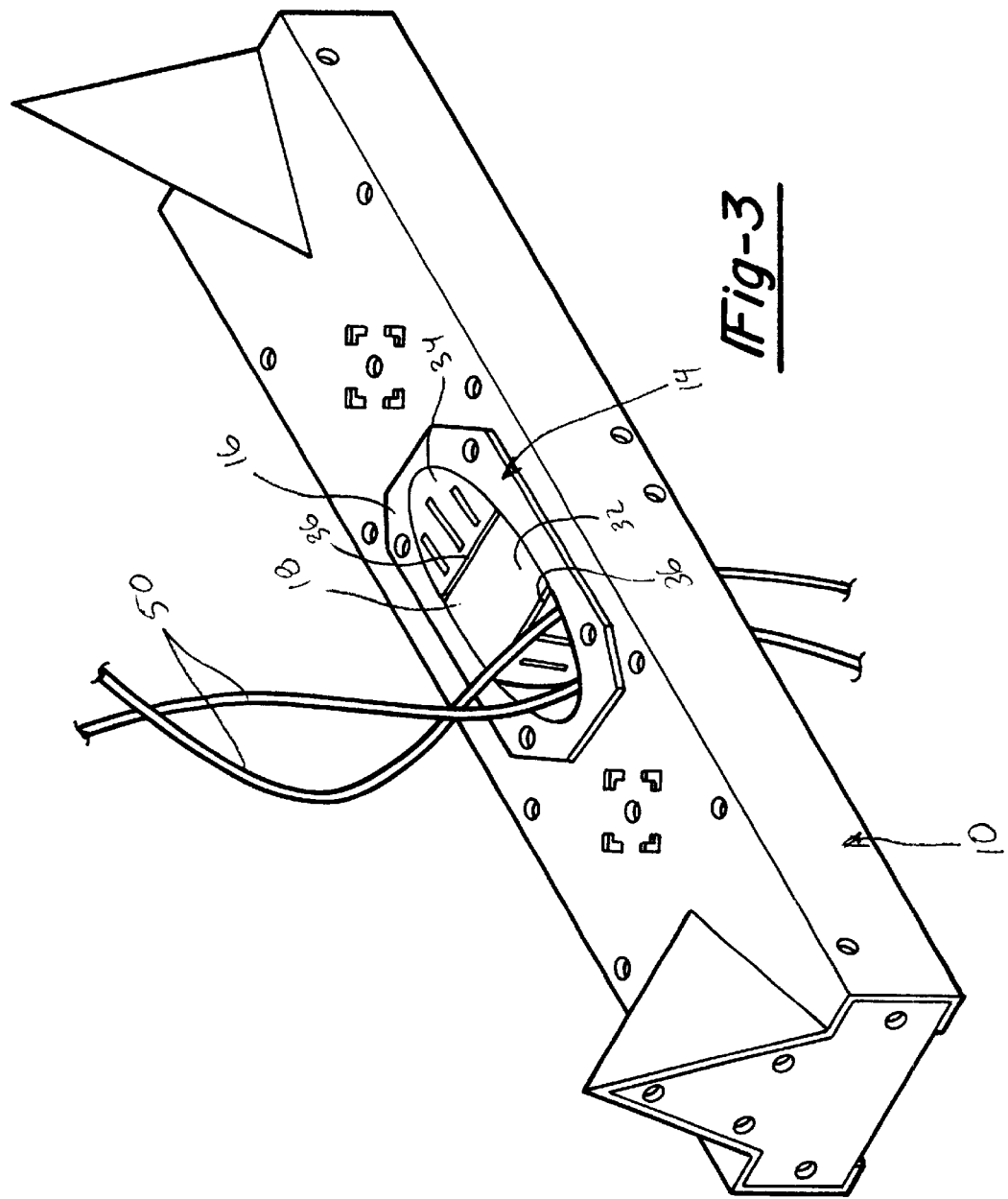

CABLE PORT GROMMET FOR MODULAR OFFICE FURNITURE

RELATED APPLICATIONS

This application claims priority from U.S. Provisional Application No. 60/117,771 filed on Jan. 29, 1999.

BACKGROUND OF THE INVENTION

I. Field of the Invention

This invention relates to modular office furniture and, in particular, to a cable port grommet seated within a fame member of the office system to facilitate the feeding of wires to a desired location through the frame members.

II. Description of the Prior Art

Modular office systems have become increasingly popular for their ease of installation and relatively low cost in association with the flexibility such systems provide. Office cubicles, desks and partitions can be easily rearranged or disassembled as personnel requirements change. However, these office systems must also be stable enough to withstand continuous use while also being capable of delivering essential utilities such as electrical power, telephones and computer networking. Because of the modular construction of such office systems, supplying such utilities must be conveniently accomplished. It is also desirable to organize the utility wiring throughout the modular system to facilitate repair or replacement.

Prior known office systems are very rigid in their construction variations. Typically, a frame is provided to which appropriate panels, drawers and desktops are mounted. Wiring may be run through the frame or between panels. However such prior known systems do not provide an opportunity to alter the system configuration using the same components. Furthermore, because of the metal construction of the frame care must be taken not to cut the wire insulation or metal edges.

SUMMARY OF THE PRESENT INVENTION

The present invention overcomes the disadvantages of the prior known modular office system by providing a cable port grommet insertable into a frame member of the office furniture to provide an exit/entry port for utility wiring needed in the furniture.

The present invention generally comprises a plastic grommet adapted to be inserted into a tubular beam member to form a port to pass wires for phones, electrical and computer networks. The grommet of the preferred embodiment includes a frame mountable to the metal support structure of the furniture. The frame includes an oval opening which receives a closure member for selective feeding of wires through the grommet. The closure preferably includes a pair of hinged flaps which can be independently bent inwardly to create an opening for the wires. The flaps are attached to a fixed center portion by a living hinge. The grommet is preferably molded of plastic such that wires passing through the grommet are prevented from engaging the metal edges of the tubular beam by the fame forming the opening.

Other objects, features and advantages of the invention will be apparent from the following detailed description taken in connection with the accompanying drawings.

BRIEF DESCRIPTION OF THE DRAWING

The present invention will be more fully understood by reference to the following detailed description of a preferred embodiment of the present invention when read in conjunction with the accompanying drawing, in which like reference characters refer to like parts throughout the views and in which:

FIG. 3 is a perspective view showing wiring passing through the grommet.

DETAILED DESCRIPTION OF A PREFERRED EMBODIMENT OF THE PRESENT INVENTION

Figure 1:
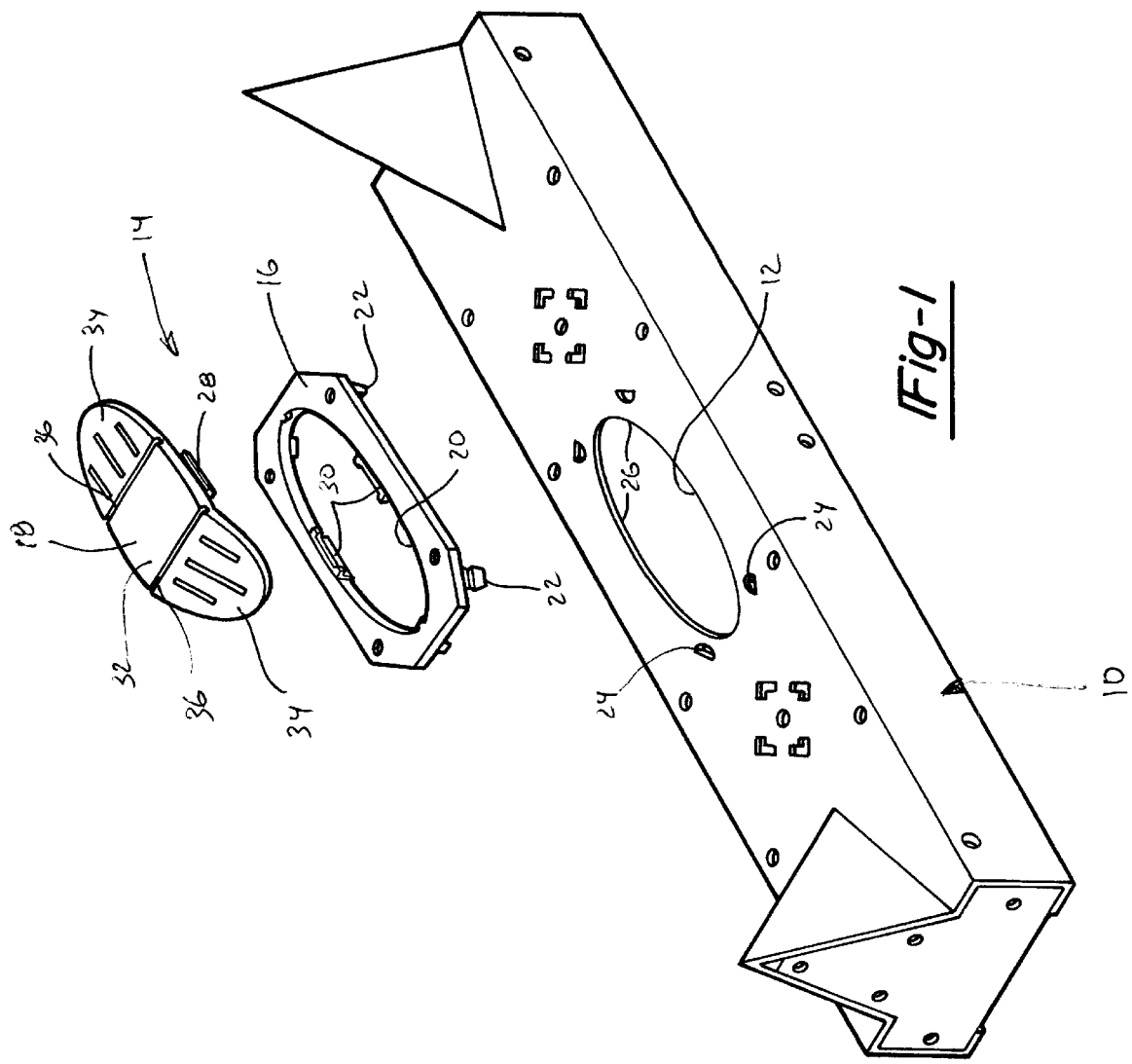
FIG. 1 is an exploded view of the cable port grommet for a furniture support member.
Figure 2:
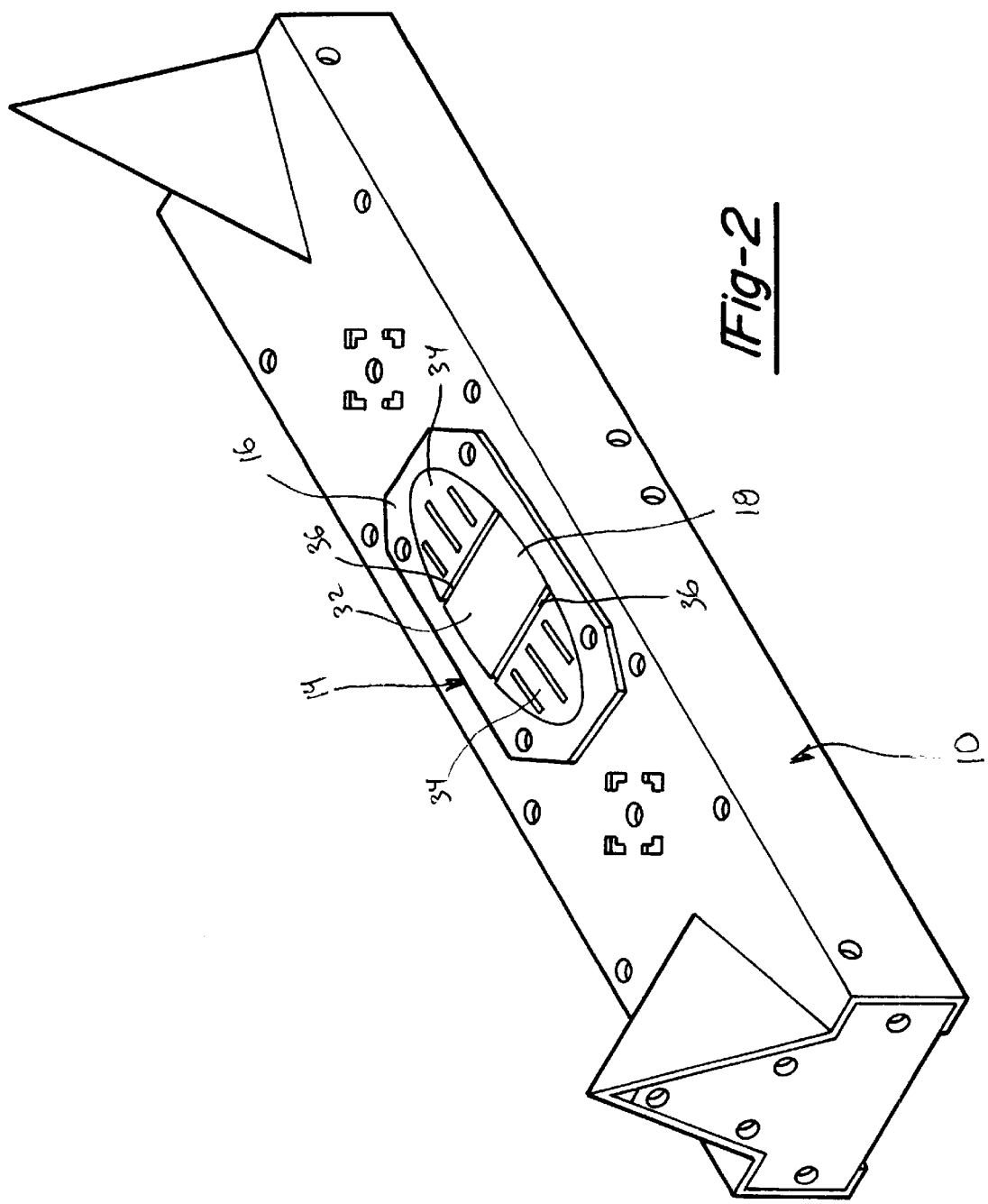
FIG. 2 is an assembled view of the cable port grommet seated within the support member.

Referring to the drawing, there is shown a tubular support member 10 forming a part of an infrastructure of an office furniture system. The furniture is preferably of a modular type and can include a desk, partition, and storage cabinets. The support members 10 are assembled in a predetermined manner form a frame of the furniture. In order to supply utilities to the furniture user, wiring is fed through the tubular members 10 from a remote source to the position required within the furniture system. Wiring for telephone, electrical and computer networks may be supplied through the tubular members 10.

In order to deliver the utility wiring to the desired location, entry/exit ports must be provided in the support member 10. An opening 12 is formed in one wall of the support 10. In a preferred embodiment, the opening 12 is oval. A closable grommet 14 is received within the opening 12 to form a port for running wiring into and out of the support member 10. The grommet 14 generally comprises a frame 16 and a closure member 18 nested within the frame 16.

The frame 16 is mountable to the support 10 and includes an oval opening 20 in communication with the opening 12 of the support 10. The frame 16 includes pins 22 which snap-fit into respective apertures 24 of the support 10 to secure the frame 16. The opening 20 of the frame 16 is slightly smaller than the opening 12 such that wires 50 passing through the grommet 14 do not engage the edge 26 of the support opening 12. Thus, the frame member 16 forms an opening 20 for the convenient and safe feeding of wires through the modular office system.

The closure member 18 is received within the frame 16 to facilitate selective running of wires 50 into or out of the support 10. The closure 18 has snap-tabs 28 which engage cooperating tabs 30 on the frame 16 to maintain the closure 18 within the frame 16. The closure member 18 has a configuration corresponding to the configuration of the frame opening 20. In the preferred embodiment shown in the drawings, the closure 18 has an oval configuration corresponding to the frame opening 20. However, any configuration for the opening 20 and closure 18 may be employed.

In the embodiment shown in the drawings, the closure 18 includes a fixed center portion 32 from which the snap-tabs 28 depend. At least one flap 34 is hingedly connected to the center portion 32. In a preferred embodiment, a pair of flaps 34 are connected to opposite sides of the center portion 32 by living hinges 36 allowing the flaps 34 to be bent downwardly to pass wires into the support 10. When the grommet 14 is not in use, the flaps 34 may be maintained in a plane with the fixed center portion 32 to close the opening 20.

The foregoing detailed description has been given for clearness of understanding only and no unnecessary limitations should be understood therefrom as some modifications will be obvious to those skilled in the art without departing from the scope and spirit of the appended claims.

What is claimed is:

1. A selectively closable grommet adapted to be mounted proximate an opening formed in a support beam of a modular office system, said grommet comprising:

a frame member having opening, said frame member having a plurality of tabs adapted to be secured within corresponding apertures formed in the support beam outside the periphery of the support beam opening such that said frame member is mounted to the support beam with said frame opening in communication with the opening formed in the support beam; and a closure member mounted within said frame member for selective closure of said frame opening, said closure member including a fixed center portion connected to said frame member and a pair of pivotable flaps movable between a closed position in planar alignment with said frame member and an open position facilitating passage through said frame opening and the opening in the beam, said pivotable flaps positioned on opposite sides of said fixed center portion for opening in opposing directions to form said openings at opposite ends of said closure member.

2. The grommet as defined in claim 1 wherein said frame opening has a substantially oval configuration.

3. The grommet as defined in claim 1 wherein said closure member includes at least on mounting tab selectively engageable with said frame member to detachably mount said closure member to said frame member.

4. The grommet as defined in claim 3 wherein said closure includes a fixed intermediate portion and a pair of pivotable flaps pivotable connected to said intermediate fixed portion.

5. The grommet as defined in claim 4 wherein said flaps are connected to said fixed intermediate portion by a living hinge such that said closure member forms an integral component.

6. The grommet as defined in claim 5 wherein said at least one mounting tab depends from said fixed intermediate portion.

7. A selectively closable grommet adapted to be mounted proximate an opening formed in a support bean of a modular office system, said grommet comprising:

a frame member having an opening, said frame member having a plurality of tabs adapted to be secured within corresponding apertures formed in the support beam outside the periphery of the support beam opening such that said frame member is mounted to the support beam with said frame opening in communication with the opening formed in the support beam; and a closure member mounted within said frame member for selective closure of said frame opening, said closure member including a fixed intermediated portion and a pair of flaps pivotably connected to opposite sides of said intermediate portion for selective opening in opposing directions, said flaps independently movable between a closed position in planar alignment with said frame member and an open position facilitating passage through said frame opening and the opening in the beam.

8. The grommet as defined in claim 7 wherein said flaps are connected to said fixed intermediate portion by a living hinge such that said closure member forms an integral component.

9. The grommet as defined in claim 8 wherein said frame member has a plurality of tabs adapted to be secured within corresponding apertures formed in the support beam, said frame member mounted to the support beam such that said frame opening aligns with the beam opening.

* * * * *